United States Patent Office 3,557,038
Patented Jan. 19, 1971

3,557,038
POLY(DIACETONE ACRYLAMIDE) MODIFIED KAOLIN
Stanley E. Gebura, Mountain Lakes, N.J., assignor to Interpace Corporation, Parsippany, N.J.
No Drawing. Filed May 3, 1968, Ser. No. 726,531
Int. Cl. C08f 45/24, 45/68
U.S. Cl. 260—29.2                    12 Claims

ABSTRACT OF THE DISCLOSURE

A process has been provided for polymerizing diacetone acrylamide monomer and a comonomer system based on diacetone acrylamide monomer onto a high surface area siliceous substance, e.g., kaolin clay, silica, etc. This process may be carried out in an aqueous phase. The monomers or comonomers are polymerized via free radical polymerization onto the surface of the siliceous substance. Diacetone acrylamide homopolymer modified siliceous substances possess improved properties. By employing diacetone acrylamide but by varying the component part of the comonomer system, modified siliceous substances, such as clays, are obtained which possess especially advantageous properties. Moreover, modified siliceous substances are obtained with properties which meet specified requirements. Products prepared by this process are within the scope of the invention as are the uses of these surface modified products for purposes as adjuvants in polymers, e.g., poly(ester), poly(vinyl chloride) and in oleaginous, alkyd, adhesive, putty, and grouting composition formulations, to name a few.

---

This invention relates to a process for preparing siliceous substances by polymerizing diacetone acrylamide as a homopolymer or copolymer onto surfaces of siliceous substances. A product obtained by the practicing of this process is within the scope of the invention as are the uses of this product, such as in combination with poly(ester), oleaginous, paint, poly(vinyl chloride), and alkyd, as well as adhesive, putty and grout compositions.

According to the process described herein, siliceous substances, such as clays, silicas both precipitated and pyrogenic, are suitable for use in the process.

The siliceous substance is reacted with the diacetone acrylamide or its comonomer system to polymerize onto the surface of the siliceous substance the monomer or comonomer.

A major reason for modifying siliceous substances is the relative availability of these low-cost materials, and, thus, the attendant economic advantages if these materials may be employed as adjuvants or substitutes for a more scarce or expensive material. Another major reason for modifying these siliceous substances is the extremely small particles which are useful for bodying various materials. These particles may be obtained by appropriately working up the naturally occurring clays by various processes well known to the art. Thus, if these small particles which possess large surface area per unit of weight are admixed with various liquids, a pronounced bodying effect is obtained. Hence, for this purpose, properly modified clays are useful in fluids such as paints, greases, oils, adhesive and grouting compositions, etc. Consequently, an important reason for seeking modification of clay surfaces is to obtain proper compatibility and dispersions of the siliceous material.

A primary reason for modifying the surface of clays and siliceous substances to make these useful for the above purposes is the natural tendency of these surfaces to be hydrophilic and organophobic. Hence, to render these siliceous materials, e.g., clays, useful in materials derived from organic compounds, the objective is to make these hydrophobic or at least organophilic. Obviously, depending on the material to which these siliceous substances will be added, various modifications are possible and have been proposed.

The foregoing makes it clear that many expensive materials have been sought to be substituted in whole or in part by siliceous materials and that in the process, siliceous materials have been sought, which if modified, can substitute or replace the expensive material. Needless to say, a proper mating of a siliceous substance as adjuvant with another material involves a multitude of problems, many interrelated and most of these highly unpredictable.

More importantly though, in order to render each siliceous sustance suitable as an adjuvant, many prerequisites have to be met. Hence, a number of criteria have to be satisfied before a proper combination of the material and its siliceous substance adjuvant can be found. It is for this reason that the finding of a proper combination of material and adjuvant has been and still is an empirical art with few, if any, guidelines. Consequently, predictable results in this field have eluded the prior art practitioner.

PRIOR ART

A number of processes have been disclosed in the prior art for modifying siliceous substances with compounds possessing ethylenically unsaturated moieties.

As a general rule, prior art processes for modifying clays with ethylenically unsaturated monomers have depended, first, on reacting the siliceous substance with a coupling compound or a derivative thereof. These coupling compounds possess an unsaturated radical or a radical capable of entering into a polymerization reaction with the ethylenically unsaturated monomer. These coupling aids are derived from compounds such as an amine, an alcohol, a quaternary ammonium compound, a sulfinium, salts of ethylenically unsaturated acids, polymers containing the above groups, or various siloxanes, silane, or organic silicon derivatives, e.g., organosilicon halides.

Not only to do these coupling compounds add another step in a polymerization process, but also the added cost of an element in this type of combination is often prohibitive when modifying such a low-price commodity as clay.

Other methods of polymerizing ethylenically unsaturated compounds on the surface of a siliceous substance depend on depositing a free radical generating compound such as peroxide or an azo compound and then, under appropriate conditions, polymerizing an ethylenically unsaturated compound with this siliceous substance. However, merely because a free radical generating compound is deposited on the surface does not necessarily result in a polymerization on or at the surface, and considerable amounts of homopolymer are formed in a reaction solution. An analogous process to that above employs an acid for treating ion exchange active clays and then reacting the same with compounds such as conjugated diolefins.

Still another method of polymerizing the ethylenically unsaturated compounds depends on the presenting of a freshly ground surface to the monomer and, thus, effecting polymerization. Because of long grinding times, imprecise polymerization controls, and concurrent grinding and polymerization, this process has failed as a viable alternative for modifying siliceous substances. It is believed that the reaction mechanism is also entirely different from that in the claimed invention. Further, in instances where the process has been employed, silica surfaces derived from quartz, silica sand, flint, etc., have been used. These are extremely hard particles, not related to clays occurring in a natural state, and require great expenditure of energy for every grinding operation.

Despite the various processes and products which have been prepared, it is still impossible to predict whether or not the physical and chemical properties of clay polymerizates will be acceptable. Merely as an example, it is still impossible to foretell what viscosity characteristics or the magnitude thereof will be displayed by a modified clay in oil or in a poly(ester). Thus, when added to an oleaginous fluid, some of the homopolymer modified clays increase the viscosity while others decrease the viscosity in reference to the same but unmodified clay added to the fluid.

From the previous prior art processes and problems, it is apparent that many routes have been tried to obtain a properly modified clay surface. Despite the profusion of processes and approaches, it is still an art to find a proper polymer system, i.e., either a homopolymer or copolymer, which achieves satifactory results on the basis of monomer utilizations, monomer depositions, surface properties of the modified product, etc.—products which may be employed in systems to which siliceous materials are generally added.

It has been found that surfaces of siliceous substances can now be modified in an unexpectedly advantageous manner by reacting the siliceous substances with diacetone acrylamide and a copolymer system based on this monome.r Heretofore, it has not been proposed to modify siliceous substances by employing diacetone acrylamide monomer or comonomer systems based on this monomer as polymerizate producers on surfaces of siliceous substances. Moreover, it is highly unexpectedly that diacetone acrylamide does impart the beneficial properties to clays or silicas even when used in small proportions in respect to other comonomers.

The above-described monomer system possesses especially advantageous properties derived from the unique interaction of the diacetone acrylamide moiety with the clay or silica surface. Whereas water soluble modifiers having hydrophilic and organophobic properties have a tendency not to form polymerizates with clay surfaces, diacetone acrylamide homopolymerizates form both hydrophilic and organophilic products when tested in water-butanol 50:50 mixture at room temperature. Further, the diacetone acrylamide homo- and copolymerizates are water insoluble. However, the diacetone acrylamide copolymers while still capable of polymerization onto the clay surface from an aqueous dispersion will form organophilic products depending, of course, on the comonomer used.

Besides the highly unexpected properties possessed by the above-described clays, the process by which these materials are produced is especially noteworthy. Thus, the polymerization is advantageously carried out in an aqueous medium, the handling of this medium is especially facile and the clay modification process is especially attractive from industrial point of view.

By varying the component parts of the monomer system, modified siliceous substances, more particularly clays such as kaolinite, are obtained which may possess highly desired bodying properties heretofore achieved via different routes with more expensive materials such as silanes. Unexpectedly, clays modified with diacetone acrylamide copolymers differ one from the other while still retaining the desired properties. Obviously, this unexpected variation in the properties allows the obtention of clays which meet specified requirements based on compatibility, viscosity, bodying effect, etc.

SILICEOUS SUBSTANCES

Siliceous substances useful in the practicing of this invention are clays such as kaolinite, attapulgite, montmorillonite, illite, pyrophillite, haloysite, mullite, micaceous materials, wollastonite, natural and synthetic silica.

"Kaolin clay" or "kaolin" describes several hydrated aluminosilicate minerals, generally of plate-like structure and comprising the species: kaolinite, nacrite, halloysite, dickite. Kaolinitic materials are described by the general formula $Al_2O_3 \cdot 2SiO_2 \cdot xH_2O$ in which $x$ is usually 2. The weight ratio of $SiO_2$ to $Al_2O_3$ is 1.18, and kaolin clays normally possess $SiO_2/Al_2O_3$ ratios from 1.0 to 1.5.

A representative kaolin clay is Hydrite 10 obtainable from Whittaker, Clark and Daniels, Inc., 100 Church St., New York, N.Y. It is a hydrated aluminum silicate which has the following chemical analysis and particle size distribution.

Typical particle size distribution of Hydrite 10 is—
Equivalent spherical diameter, microns:

| Under— | Cumulative, percent |
|---|---|
| 4 | 100 |
| 2 | 95 |
| 1 | 80 |
| 0.5 | 44 |
| 0.2 | 7 |

Chemical composition of Hydrite 10 is:

| | |
|---|---|
| Silica ($SiO_2$) | 44.94 |
| Aluminum oxide ($Al_2O_3$) | 38.22 |
| Ferric oxide ($Fe_2O_3$) | 0.27 |
| Calcium oxide (CaO) | 0.06 |
| Magnesium oxide (MgO) | 0.28 |
| Titanium dioxide ($TiO_2$) | 1.75 |
| Potash ($K_2O$) | 0.04 |
| Soda ($Na_2O$) | 0.21 |
| Loss on ignition | 13.6 |
| Moisture, max. | 1.0 |
| Free moisture | 0.52 |

Other suitable siliceous materials are the Glomax series of kaolin clays such as Glomax LL available from Georgia Kaolin Co. The properties of these series of clays are defined in its Bulletin TSB–5 (this bulletin also gives fairly typical particle size distribution curves for kaolin clays). A representative wollastonite is available from Cabot Corp. under the trade name Cab-O-Tite. Another suitable clay is "Ione" air floated kaolin clay available from Interpace, Parsippany, N.J. Typical properties of the last are—

Physical properties

| | |
|---|---|
| Specific gravity | 2.60 |
| Moisture (max.) percent | 0.5–1.0 |
| Screen residue 25 mesh (max.) percent | 0.0–0.1 |
| Particle size, percent: | |
| Minus 2 microns | 50–55 |
| Plus 5 microns | 20–25 |

Chemical analysis

| | |
|---|---|
| Silica, percent | 45.0–47.0 |
| Alumina, percent | 37.5–39.0 |
| Iron oxide, percent | 0.3–0.5 |
| Titanium dioxide, percent | 1.5–2.0 |
| Ignition loss | 13.0–14.0 |

As still other siliceous substances, both natural and synthetic silicas are also within the purview of this invention. Examples of synthetic silica include both precipitated and pyrogenic types. Of the latter, the following are representative, Cab-O-Sil available from the Cabot Corp. and Arc Silica-70 available from Pittsburgh Plate Glass Co. Of the precipitated silicas, the following are representative, Hi-Sil available from Pittsburgh Plate Glass Co. and Ludox available from Du Pont Chemical Corp. Suitable natural silica examples are MiSil A–15 and "Amorphous Silica 'O' Grade" available from Illinois Mineral Company, Cairo, Ill.

Representative properties of "Amorphous Silica 'O' Grade" are as follows:

Physical properties

Molecular weight—60.09
Melting point—3100° F. (1722° C.)
Hegman gauge (fineness of grind)—5.5
200 mesh screen (thru)—99.99%
325 mesh screen (thru)—93.73%
400 mesh screen (thru)—98.92%

Av. part. size (Fisher sub sieve)—2.35
Specific surface area, cm.$^2$/g.—9,635

Particle size distribution

Micron diameter: Percent
- 40 — Below 95.50
- 20 — Below 82.00
- 15 — Below 73.00
- 10 — Below 62.00
- 7.5 — Below 58.00
- 5.0 — Below 46.00

Further, Amorphous A–15 Grade Silica Mi-Sil has the following characteristics.

Physical properties 200 mesh screen (thru)—100.00%
325 mesh screen (thru)—100.00%
400 mesh screen (thru)—99.99%
Av. part. size (Fisher sub sieve)—1.82
Specific surface area, cm.$^2$/g.—12,440

Particle size distribution

Micron diameter: Percent
- 40 — Below 100.00
- 20 — Below 100.00
- 15 — Below 99.00
- 10 — Below 96.00
- 7.5 — Below 87.00
- 5.0 — Below 70.00

As can be appreciated, the above siliceous substances are given merely by way of an example, the diverse, useful siliceous substances having been recited previously.

For purposes of suitable comparisons on a relative as well as on an absolute scale of the various properties of the novel, modified siliceous substances, Hydrite 10 is used as a standard.

THE MONOMER SYSTEM

As indicated previously, a particular monomer and a combination of this monomer with appropriate comonomers have been unexpectedly found to permit modification of the physical and chemical properties of a siliceous substance. This invention has been predicated on the unexpected discovery that polymerizing diacetone acrylamide on a clay surface produces a tenaceously bound polymerizate on the clay surface, even when the proportions of diacetone acrylamide in the polymerizate constitute a small proportion thereof. Hence, the overall properties of a silaceous system can be modified in a far-reaching manner. Thus, despite the fact that the major part of the polymerizate is derived from a monomer consisting e.g., from 60% to 99% of the comonomer, a mere addition, say as little as 2%, of diacetone acrylamide vastly changes the properties of the thus modified clay surface.

It is obvious that the above properties are based on the use of diacetone acryamide as the essential component in the comonomer system to achieve the particular coaction with the other comonomer and with the clay surface. Because of the peculiar and surprising coaction of diacetone acrylamide with the siliceous surface and another comonomer, the poly(comonomer) is not readily displaced by solvents or re-agents in systems to which the siliceous substance may be added as an adjuvant or extender.

A suitable comonomer in the diacetone acrylamide polymer system is a monomer which is capable of polymerizing together with the diacetone acrylamide. Representative comonomers are: vinyl acetate, vinyl chloride, acrylonitrile, maleic anhydride, acrylic and methacrylic esters of 1 to 8 carbon atoms in the ester moiety, acrylic and methacrylic acid, vinylidene chloride, butadiene, isoprene.

The preferred combination of the described diacetone diacrylamide comonomer systems is based on styrene. The proportions of comonomers to diacetone acrylamide are 99:1 to 1:2, with 98:2 to 1:1 being the narrower range. Generally, the practical range is from 98:2 to 3:1.

INITIATOR

In the polymerization step, peroxidic initiators are used. Such peroxidic initiators include hydrogen peroxide, persulfates such as ammonium, sodium or potassium persulfate, hydroperoxides such as t-butyl hydroperoxide, di-isopropylbenzene, hydroperoxide, cumene hydroperoxide, 1-phenylethylhydroperoxide, etc.; diacylperoxides such as benzoyl peroxide, acetyl peroxides and the like; di-alkyl peroxides such as di-t-butyl peroxide, dicymyl peroxide, etc.; peresters such as t-butyl peroxyacetate, t-butyl peroxybenzoate and the like; peracids such as performic acid, peracetic acid, perbenzoic acid, peroxylactic acid and the like; and other such as dialkyl peroxydicarbonates, azo-iso-bytronitrile and the like. These peroxy compounds must be capable of initiating a free radical polymerization by themselves or in the presence of an activator, such as a reducing agent.

DESCRIPTION OF PROCESS

The reaction is conveniently carried out in a reaction vessel, provided with a stirrer, reflux condenser and, optionally, with an inlet for an inert gas such as nitrogen. An appropriate amount of clay such as Hydrite 10 is dispersed in de-ionized water (obtained by using commercial ion-exchange resins) and is introduced into the vessel. A ratio of 1:1 to 10:1, generally 1:1 to 3:1, water to clay on weight basis is suitable; a preferred range is 25 to 45% of solids. To this dispersion is added an initiator of the above-described class in an amount from 0.1% to 2.0% based on the amount of introduced monomers to be used. Thereafter, diacetone acrylamide or diacetone acrylamide and a comonomer are added. In general, the reaction is conducted in both aqueous and non-aqueous solutions from room temperature on up to about the reflux temperature of the particular dispersion, generally from room temperature up to a temperature of 125° C. As it is well known in the art, the temperatures employed are those at which the free radical initiator readily causes polymerization to take place.

Hydrocarbon solvents are preferred. Included are the aromatic, alicyclic and aliphatic hydrocarbons, for example, benzene, toluene, xylene, cumene, cyclohexylbenzene, cyclohexane, dimethylpentane, octane, dodecane, naphthas boiling between 50° C. and 150° C., and the like. Choice of a suitable quantity of solvent is principally dependent upon ease of manipulation. From 1 to 5 parts by weight of solvent per weight of clay is usually sufficient. The above solvents are employed as long as the diacetone acrylamide and the respective comonomer used therewith are reasonably soluble therein.

The total mixture is reacted for a period which will depend upon the temperature, clay, and added monomer or comonomer involved, but will generally range from 1 to 10 hours. Following this reaction, the modified clay or siliceous substance is recovered by filtration and drying below the temperature at which the modified product decomposes. Thereafter, the product is pulverized and incorporated as an adjuvant in one of the described materials, e.g., polyester.

Based on practical considerations, the amount of polymer addition is from 0.2% to 5% or even up to 10%. However, generally from 0.5% to 2%, on weight of the siliceous or clay material is a practical range. More importantly, this addition is achieved with little, if any, loss of polymer formation in the solution.

In order to describe the present invention so that it may be more clearly understood, Examples 1 to 4 and the following examples set forth in a table illustrate the invention. In these examples, all parts are expressed in parts by weight unless otherwise stated. The examples are set forth primarily for the purpose of illustration, and any specific enumeration of detail contained therein should not be interpreted as a limitation on the concept of this invention.

EXAMPLE 1

In a one liter 3-necked flask, fitted with a stirrer, reflux condenser and a nitrogen inlet, a dispersion of 100 g. Hydrite 10 kaolin in 400 ml. of de-ionized water was prepared. To the dispersion was added three ml. of one percent potassium persulfate solution followed by 2.0 g. of a mixture comprising 50 parts of styrene and 50 parts diacetone acrylamide. The mixture was heated at 70° C.±2° during 3.5 hours while nitrogen was continually swept over the reaction mixture. The mixture was cooled, filtered, dried and pulverized.

A dispersion of 40 parts of the product in polyester resin was prepared. The dispersion had a Brookfield viscosity of 10,000 cps. at 20 r.p.m. A similar dispersion prepared with the same unmodified kaolin had a viscosity of 29,000 cps.

EXAMPLE 2

In a similar experiment as described in Example 1, Burgess-30 kaolin (a calcined kaolin) was modified by in situ polymerization of 1 part, per 100 parts of clay, of a mixture comprising 98 parts of styrene and 2 parts diacetone acrylamide.

EXAMPLE 3

Glomax LL (a calcined kaolin from Georgia Kaolin Co. and described in its Technical Bulletin TSB-5) was modified by ½ part of the same comonomer mixture per 100 parts of clay by a procedure similar to that described in Example 1.

Dispersion of the unmodified kaolins and the modified kaolins were prepared by mixing 40 parts of kaolin with 60 parts dioctylphthalate.

The following Brookfield viscosity data were obtained with these dispersions:

| | Cps. (10 r.p.m.) |
|---|---|
| Kaolin unmodified (Burgess-30) | 5900 |
| Kaolin Ex. 2 | 1540 |
| Glomax LL unmodified | 5400 |
| Kaolin Ex. 3 | 1000 |

The highly unexpected degree of reduction in viscosity is especially noteworthy.

EXAMPLE 4

Two samples of kaolin were modified with diacetone acrylamide according to the procedure described above in Example 1 by reacting 4 parts of diacetone acrylamide with 100 parts of kaolin. The kaolins were Calcined Ione Air Floated and Hydrite 10. The obtained kaolin was organophilic as determined by dispersion of the kaolins in a butanol-water mixture.

TABLE

| Kaolin | Monomer compn. | | Parts monomers/ 100 parts Kaolin | Polyester [1] | Brookfield Viscosity [2] | |
|---|---|---|---|---|---|---|
| | Diacetone acrylamide | Styrene | | | R.p.m. | Cps. |
| Hydrite 10 | 50 | 50 | 4 | A | 20 | 12,250 |
| Do | 50 | 50 | 2 | A | 20 | 10,000 |
| Do | 2 | 98 | 2 | A | 20 | 11,500 |
| Hydrite 10 (calcined) | 50 | 50 | 2 | A | 20 | 23,000 |
| Do | | | | A | 20 | 94,000 |
| Hydrite 10 | | | | A | 20 | 29,000 |
| Glomex LL | | | | B | 10 | 35,000 |
| Do | | 100 | 2 | B | 10 | 26,500 |

[1] Polyesters A and B are general purpose polyester resins of phthalic acid with maleic acid or fumaric acid added thereto and an alkylene glycol such as ethylene glycol as the glycol component. The glycol is modified with an appropriate triol for purposes of cross-linking the ester, additionally stryene is added to the ester to effect cross-linking through the ethylenically unsaturated bond of the dibasic acid and the vinyl group of styrene monomer. Ester B is basically the same as A except that the latter contains more styrene.
[2] Dispersions containing 40% by weight kaolin were prepared.

As mentioned before, the modified clay products are suitable for polyester dispersions as adjuvant therein.

The liquid unsaturated polyester resins employed in producing improved molding compositions of this invention are obtained by reacting together a dihydric alcohol and a dibasic acid, either of which contains ap air of double bonded carbon atoms. The unsaturated long chain polyester molecule is essentially linear and is capable of being cross-linked to form a thermosetting resin solid through the double bonds in the ester. A liquid unsaturated monomer, such as styrene, is employed as a cross-linking solvent, and an organic peroxide is usually employed to catalyze the cross-linking reaction. These unsaturated polyesters are characterized by thermosetting without evolution of water. Commercially available unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 btuylene and 1:4 butylene glycols; diethylene glycol and triethylene glycol.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal crosslinking agents.

As mentioned, the crosslinking reaction is catalyzed with a peroxide catalyst, usually benzoyl peroxide. Other catalysts are methyl ethyl ketone peroxide and methyl isobutyl ketone peroxide.

Accelerators, stabilizers, promotors and coloring agents may be incorporated in the polyester when desired, as well as auxiliary fillers such as fibrous asbestos, calcium carbonates, etc.

In the preparation of moldable polyester mixes employing the novel, coated kaolin, the clay is added to the unsaturated liquid polyester resin in the same manner and with equipment usually employed for adding clay or other fillers to the resin.

Generally, the amount of adjuvant added to a polyester ranges from 10% to 200% based on the polyester; from 28% to 80% is the usual range, although from 40% to 50% is the most common range.

Obviously, many references are found in the prior art concerning the production of polyester compositions and the use of these with clay adjuvants. Exemplary of these are U.S. Pats. 3,131,148 and 3,032,431.

In a practical application of the above concept, Hydrite 10 was modified with poly(diacetone acrylamide, and styrene, 98:2) in accordance with the process as described in Example 2 and formulated with a polyester resin at 40:60 ratio by weight of modified clay to resin, a dispersion was obtained which is useful for incorporation in formulatns used such as fr preparng weatherffg°hd polyester formulations used such as for preparing weather boards or for preparing premix compositions ("gunks").

Besides the above-demonstrated applications, the siliceous substances as modified according to this invention are also suitable for advantageous incorporation in poly (vinyl chloride) blends, paints, and alkyd base compositions as well as oleaginous, adhesive, putty and grouting composition formulations. In this connection, the conventional testing procedures such as ASTM procedures used in these arts for proving the efficacy of the additives are employed in reference to the herein described adjuvants.

What is claimed is:

1. A fine, particulate clay, silica or silicate, said particulate clap, silica or silicate having its surface modified after admixture with and in situ polymezriation with diacetone acrylamide as a precursor for ploy(diacetone acrylamide) or a copolymer of diacetone acrylamide and an ethylenically unsaturated comonomer in a ratio from 99:1 to 1:2 of ethylenically unsaturated monomer to diacetone acrylamide, in an amount from 0.2% to 10%, on basis of the weight of the clay, silica or silicate.

2. The modified particulate according to claim 1 wherein the particulate is silica or synthetic silica.

3. The particulate according to claim 1, wherein the particulate is wollastonite.

4. A fine, particulate, of clay, silica or silicate said clay, silica or silicate having as a polymerization product on its surface, after admixture with an in situ polymerization with said clay, silica or silicate, a copolymer derived from diacetone acrylamide as a monomer and, as a comonomer precursor for said diacetone acrylamide, a monomer selected from the group consisting of vinyl acetate, vinyl chloride, acrylonitrile, maleic anhydride, acrylic and methyacrylic esters of 1 to 8 carbon atoms in the ester moiety, vinylidene chloride, butadiene and isoprene said comonomer and diacetone acrylamide being in a ratio from 99:1 to 1:2.

5. A product according to claim 1 wherein the particulate is kaolin clay.

6. A polymerizable polyester resin of a dibasic acid and a polyol, comprising as an adjuvant a finely divided particulate of clay, silica or silicate, the finely divided particulate having surfaces thereof modified by admixture with and in situ polymerization with diacetone acrylamide as a precursor of poly(diacetone acrylamide) in an amount from 0.2% to 5% on basis of the weight of the dry particulate.

7. A polymerizable polyester resin of a dibasic acid and a polyol, comprising as an adjuvant a finely divided particulate of clay, silica or silicate, the finely divided particulate having surfaces thereof modified, after admixture with and an in situ polymerization, with a polymerization product of diacetone acrylamide or diacetone acrylamide and an ethylenically unsaturated comonomer in a ratio of said comonomer to diacetone acrylamide from 99:1 to 1:2 said comonomer being selected from the group consisting of vinyl acetate, vinyl chloride, acrylonitrile, maleic anhydride, acrylic and methacrylic esters of 1 to 8 carbon atoms in the ester moiety, vinylidene chloride, butadiene and isoprene is an amount from 0.2% to 10% on basis of the weight of the dry particulate.

8. An oleaginous, alkyd, or poly(vinyl chloride) base material comprising as an adjuvant in an amount of up to 200%, a finely divided particulate of clay, silica or silicate, said particulate having a surface modified, after admixture with an in situ polymerization, with a polymerization product therewith of diacetone acrylamide or diacetone acrylamide and an ethylenically unsaturated comonomer polymerizable with diacetone acrylamide in an amount from 0.2% to 10% on basis of the weight of the dry particulate, said comonomer and diacetone acrylamide being in a ratio from 99:1 to 1:2, respectively.

9. The method of forming a finely divided organophilic particulate of clay, silica or silicate, said method comprising the steps of: adding an aqueous solution, aqueous dispersion, or a solvent solution of diacetone acrylamide or diacetone acrylamide and another ethylenically unsaturated comonomer to said particulate in a ratio of 99:1 to 1:2 of comonomer to diacetone acrylamide, respectively, reacting said diacetone acrylamide or diacetone acrylamide and comonomer with the surface of the particulate in the presence of a peroxidic initiator at a temperature at or below the reflux temperature of the system; and recovering the particulate with the polymeric reaction product on the surface thereof by filtering and drying the same.

10. The process according to claim 9 wherein the particulate is kaolin, styrene is the ethylenically unsaturated comonomer, and the temperature at which the reaction is carried out is 70° C.

11. A polymerizable composition as defined in claim 6 and wherein the same contains an unsaturated diluent capable of reacting with said resin.

12. A polymerizable resin composition as defined in claim 7 and wherein the resin is dissolved in an unsaturated diluent capable of reacting with the same.

References Cited
UNITED STATES PATENTS 3,197,425   7/1965   Konig et al.   106—308
3,208,867   9/1965   Weldes   106—308

FOREIGN PATENTS 1,045,869   10/1966   Great Britain   260—89.7

MORRIS LIEBMAN, Primary Examiner

S. M. PERSON, Assistant Examiner

U.S. Cl. X.R.

106—308; 117—100; 260—37, 40, 41, 88.1, 89.7